US009814977B2

(12) United States Patent
Stafford et al.

(10) Patent No.: US 9,814,977 B2
(45) Date of Patent: *Nov. 14, 2017

(54) SUPPLEMENTAL VIDEO CONTENT ON A MOBILE DEVICE

(75) Inventors: Jeffrey R. Stafford, Redwood City, CA (US); Yunpeng Zhu, Foster City, CA (US); Steven Osman, San Francisco, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 12/835,657

(22) Filed: Jul. 13, 2010

(65) Prior Publication Data
US 2012/0017236 A1    Jan. 19, 2012

(51) Int. Cl.
*A63F 13/332* (2014.01)
*A63F 13/00* (2014.01)
(Continued)

(52) U.S. Cl.
CPC ............ *A63F 13/332* (2014.09); *A63F 13/00* (2013.01); *A63F 13/213* (2014.09); *A63F 13/26* (2014.09); *A63F 13/27* (2014.09); *A63F 13/323* (2014.09); *A63F 13/65* (2014.09); *A63F 13/843* (2014.09); *G07F 17/3202* (2013.01); *G07F 17/323* (2013.01); *G07F 17/3211* (2013.01); *G11B 27/11* (2013.01); *H04N 21/4122* (2013.01); *H04N 21/4126* (2013.01); *H04N 21/4223* (2013.01); *H04N 21/4722* (2013.01); *A63F 13/23* (2014.09); *A63F 2300/1093* (2013.01);
(Continued)

(58) Field of Classification Search
CPC . A63F 13/00; H04N 21/4122; H04N 21/4126
USPC ................................ 725/32, 37–61, 112–113
See application file for complete search history.

(56) References Cited

U.S. PATENT DOCUMENTS 4,787,051 A    11/1988  Olson
4,843,568 A     6/1989  Krueger
(Continued)

FOREIGN PATENT DOCUMENTS

CN    101002475 A    7/2007
CN    101374090 A    2/2009
(Continued)

OTHER PUBLICATIONS

PCT Application No. PCT/US2011/042456, International Search Report and Written Opinion, dated Nov. 4, 2011, 12 pages.
(Continued)

*Primary Examiner* — Nathan Flynn
*Assistant Examiner* — Alexander Q Huerta
(74) *Attorney, Agent, or Firm* — Kilpatrick Townsend & Stockton LLP

(57) ABSTRACT

Methods, systems, devices, and software are described for providing supplemental content for display on a mobile device. In one embodiment, a system includes a video display that displays video content. A mobile device with an integrated display may track the video display, with a video camera or other methods, and identify the video content in the tracked video display. The mobile device may access supplemental content related to the identified video content, and display the accessed supplemental content on the integrated display.

20 Claims, 12 Drawing Sheets

(51) Int. Cl.

| | | |
|---|---|---|
| *H04N 21/41* | (2011.01) | |
| *H04N 21/4223* | (2011.01) | |
| *H04N 21/4722* | (2011.01) | |
| *G07F 17/32* | (2006.01) | |
| *A63F 13/26* | (2014.01) | |
| *A63F 13/65* | (2014.01) | |
| *A63F 13/213* | (2014.01) | |
| *A63F 13/843* | (2014.01) | |
| *A63F 13/27* | (2014.01) | |
| *A63F 13/323* | (2014.01) | |
| *A63F 13/23* | (2014.01) | |
| *G11B 27/11* | (2006.01) | |

(52) U.S. Cl.
CPC ... *A63F 2300/301* (2013.01); *A63F 2300/403* (2013.01); *A63F 2300/69* (2013.01); *A63F 2300/8088* (2013.01)

(56) References Cited

U.S. PATENT DOCUMENTS

| | | | |
|---|---|---|---|
| 5,128,671 A | 7/1992 | Thomas, Jr. | |
| 5,528,265 A | 6/1996 | Harrison | |
| 5,831,664 A * | 11/1998 | Wharton | H04N 7/163 345/156 |
| 5,929,849 A * | 7/1999 | Kikinis | 725/113 |
| 6,157,368 A | 12/2000 | Faeger | |
| 6,247,022 B1 | 6/2001 | Yankowski | |
| 6,375,572 B1 | 4/2002 | Masuyama | |
| 6,615,268 B1 * | 9/2003 | Philyaw | G06F 17/30876 707/E17.112 |
| 6,993,573 B2 * | 1/2006 | Hunter | G06F 17/30879 235/462.11 |
| 7,036,083 B1 | 4/2006 | Zenith | |
| 7,200,857 B1 | 4/2007 | Rodriguez et al. | |
| 7,209,942 B1 | 4/2007 | Hori et al. | |
| 7,398,000 B2 | 7/2008 | Green | |
| 7,536,706 B1 | 5/2009 | Sezan et al. | |
| 7,549,052 B2 | 6/2009 | Haitsma et al. | |
| 7,581,034 B2 | 8/2009 | Polivy et al. | |
| 7,599,580 B2 | 10/2009 | King et al. | |
| 7,898,504 B2 | 3/2011 | Fischer | |
| 8,037,496 B1 | 10/2011 | Begeja et al. | |
| 8,188,969 B2 | 5/2012 | Morin et al. | |
| 8,251,290 B1 * | 8/2012 | Bushman | G06K 7/1443 235/384 |
| 8,253,649 B2 | 8/2012 | Imai et al. | |
| 8,463,000 B1 | 6/2013 | Kaminski, Jr. | |
| 8,560,583 B2 | 10/2013 | Mallinson | |
| 8,644,842 B2 | 2/2014 | Arrasvuori et al. | |
| 8,730,354 B2 | 5/2014 | Stafford et al. | |
| 8,838,671 B2 | 9/2014 | Wies et al. | |
| 8,874,575 B2 | 10/2014 | Mallinson | |
| 9,113,217 B2 | 8/2015 | Mallinson | |
| 9,143,699 B2 * | 9/2015 | Osman | H04N 5/2621 |
| 9,264,785 B2 | 2/2016 | Mallinson | |
| 9,473,820 B2 | 10/2016 | Mallinson | |
| 2002/0028000 A1 | 3/2002 | Conwell et al. | |
| 2002/0059604 A1 | 5/2002 | Papagan | |
| 2002/0078456 A1 * | 6/2002 | Hudson | G06F 17/30017 725/60 |
| 2002/0085097 A1 | 7/2002 | Colmenarez et al. | |
| 2002/0140855 A1 | 10/2002 | Hayes | |
| 2002/0162118 A1 * | 10/2002 | Levy | H04N 7/088 725/110 |
| 2002/0186676 A1 | 12/2002 | Milley et al. | |
| 2003/0028873 A1 * | 2/2003 | Lemmons | H04N 7/17318 725/36 |
| 2003/0093790 A1 | 5/2003 | Logan et al. | |
| 2003/0152366 A1 | 8/2003 | Kanazawa et al. | |
| 2003/0156144 A1 | 8/2003 | Morita | |
| 2003/0171096 A1 * | 9/2003 | Ilan et al. | 455/3.06 |
| 2003/0185541 A1 | 10/2003 | Green et al. | |
| 2003/0212762 A1 | 11/2003 | Barnes et al. | |
| 2004/0001161 A1 | 1/2004 | Herley | |
| 2004/0210824 A1 * | 10/2004 | Shoff et al. | 715/500.1 |
| 2004/0212589 A1 | 10/2004 | Hall et al. | |
| 2005/0005308 A1 | 1/2005 | Logan et al. | |
| 2005/0108026 A1 | 5/2005 | Brierre | |
| 2005/0123267 A1 | 6/2005 | Tsumagari | |
| 2005/0193425 A1 | 9/2005 | Sull et al. | |
| 2005/0220439 A1 | 10/2005 | Carton et al. | |
| 2005/0227674 A1 | 10/2005 | Kopra et al. | |
| 2005/0262548 A1 | 11/2005 | Shimojo et al. | |
| 2006/0038833 A1 * | 2/2006 | Mallinson et al. | 345/633 |
| 2006/0053472 A1 | 3/2006 | Goto et al. | |
| 2006/0064734 A1 * | 3/2006 | Ma | H04N 7/088 725/136 |
| 2006/0184960 A1 | 8/2006 | Horton et al. | |
| 2006/0285772 A1 | 12/2006 | Hull et al. | |
| 2007/0106551 A1 | 5/2007 | McGucken | |
| 2007/0113263 A1 * | 5/2007 | Chatani | H04N 5/76 725/135 |
| 2007/0124756 A1 | 5/2007 | Covell et al. | |
| 2007/0130580 A1 | 6/2007 | Covell et al. | |
| 2007/0136773 A1 | 6/2007 | O'Neil et al. | |
| 2007/0143777 A1 | 6/2007 | Wang et al. | |
| 2007/0143778 A1 | 6/2007 | Covell et al. | |
| 2007/0169115 A1 | 7/2007 | Ko et al. | |
| 2007/0248158 A1 | 10/2007 | Vieron et al. | |
| 2007/0250716 A1 | 10/2007 | Brunk et al. | |
| 2008/0215679 A1 | 9/2008 | Gillo et al. | |
| 2008/0226119 A1 * | 9/2008 | Candelore | G06F 17/30256 382/100 |
| 2008/0246694 A1 | 10/2008 | Fischer | |
| 2008/0267584 A1 | 10/2008 | Green | |
| 2008/0275763 A1 | 11/2008 | Tran et al. | |
| 2008/0276278 A1 * | 11/2008 | Krieger et al. | 725/40 |
| 2009/0019474 A1 * | 1/2009 | Robotham | H04L 29/06027 725/35 |
| 2009/0037975 A1 | 2/2009 | Ishikawa | |
| 2009/0055383 A1 * | 2/2009 | Zalewski | 707/5 |
| 2009/0063277 A1 | 3/2009 | Bernosky et al. | |
| 2009/0123025 A1 | 5/2009 | Deng et al. | |
| 2009/0154806 A1 | 6/2009 | Chang et al. | |
| 2009/0228921 A1 | 9/2009 | Miki et al. | |
| 2009/0285444 A1 | 11/2009 | Erol et al. | |
| 2009/0327894 A1 * | 12/2009 | Rakib et al. | 715/719 |
| 2010/0007050 A1 | 1/2010 | Kagawa et al. | |
| 2010/0053164 A1 * | 3/2010 | Imai et al. | 345/427 |
| 2010/0086283 A1 * | 4/2010 | Ramachandran | H04N 5/44591 386/241 |
| 2010/0091198 A1 * | 4/2010 | Matsuo | H04N 5/4403 348/734 |
| 2010/0100581 A1 * | 4/2010 | Landow et al. | 709/203 |
| 2010/0119208 A1 | 5/2010 | Davis et al. | |
| 2010/0122283 A1 * | 5/2010 | Button | G06Q 30/0601 725/32 |
| 2010/0149072 A1 * | 6/2010 | Waeller | B60K 35/00 345/7 |
| 2010/0166309 A1 | 7/2010 | Hull et al. | |
| 2010/0222102 A1 * | 9/2010 | Rodriguez | 455/557 |
| 2010/0257252 A1 | 10/2010 | Dougherty et al. | |
| 2010/0275235 A1 | 10/2010 | Joo et al. | |
| 2010/0309225 A1 | 12/2010 | Gray et al. | |
| 2010/0318484 A1 | 12/2010 | Huberman et al. | |
| 2010/0322469 A1 * | 12/2010 | Sharma | G10L 19/018 382/100 |
| 2011/0053642 A1 | 3/2011 | Lee | |
| 2011/0071838 A1 | 3/2011 | Li-Chun Wang et al. | |
| 2011/0078729 A1 | 3/2011 | LaJoie et al. | |
| 2011/0103763 A1 * | 5/2011 | Tse et al. | 386/201 |
| 2011/0246495 A1 * | 10/2011 | Mallinson | G06F 17/30026 707/758 |
| 2012/0013770 A1 | 1/2012 | Stafford et al. | |
| 2012/0059845 A1 | 3/2012 | Covell et al. | |
| 2012/0086630 A1 * | 4/2012 | Zhu | A63F 13/355 345/156 |
| 2012/0099760 A1 | 4/2012 | Bernosky et al. | |
| 2012/0143679 A1 | 6/2012 | Bernosky et al. | |

(56) References Cited

U.S. PATENT DOCUMENTS

| | | | |
|---|---|---|---|
| 2012/0210349 A1* | 8/2012 | Campana | G06F 3/147 |
| | | | 725/32 |
| 2013/0194437 A1 | 8/2013 | Osman | |
| 2013/0198642 A1* | 8/2013 | Carney | G06F 3/0484 |
| | | | 715/738 |
| 2015/0026716 A1 | 1/2015 | Mallinson | |
| 2015/0156542 A1 | 6/2015 | Covell et al. | |
| 2015/0358679 A1 | 12/2015 | Mallinson | |
| 2015/0379043 A1 | 12/2015 | Hull et al. | |
| 2016/0014350 A1 | 1/2016 | Osman | |
| 2016/0030845 A1 | 2/2016 | Stafford et al. | |
| 2016/0112762 A1 | 4/2016 | Mallinson | |
| 2017/0013313 A1 | 1/2017 | Mallinson | |
| 2017/0013314 A1 | 1/2017 | Mallinson | |

FOREIGN PATENT DOCUMENTS

| | | | |
|---|---|---|---|
| CN | 101651834 A | 2/2010 | |
| DE | WO 2008025407 A1 * | 3/2008 | B60K 35/00 |
| EP | 1053642 | 11/2000 | |
| EP | 2 180 652 A1 | 4/2010 | |
| JP | P2000-242661 A | 9/2000 | |
| JP | 2000-287184 A | 10/2000 | |
| JP | P2001-036875 A | 2/2001 | |
| JP | P2002-118817 A | 4/2002 | |
| JP | P2002-198840 A | 7/2002 | |
| JP | 2004/034281 | 4/2004 | |
| JP | 2005-532578 A | 10/2005 | |
| JP | 2006-5897 A | 1/2006 | |
| JP | P2007-088801 A | 4/2007 | |
| JP | 2008-283344 | 11/2008 | |
| JP | P2009-033769 A | 2/2009 | |
| KR | 2008-0101075 A | 11/2008 | |
| KR | 2009-0043526 A | 5/2009 | |
| WO | 2004/004351 | 1/2004 | |
| WO | 2005/006610 A1 | 1/2005 | |
| WO | 2007/064641 A2 | 6/2007 | |
| WO | 2008/024723 A2 | 2/2008 | |
| WO | 2008/051538 A2 | 5/2008 | |
| WO | WO 2008/056180 A2 | 5/2008 | |
| WO | 2009/032707 A1 | 3/2009 | |
| WO | 2009/036435 A1 | 3/2009 | |
| WO | WO 2010/020739 A1 | 2/2010 | |

OTHER PUBLICATIONS

Mark Toner, Abstract of dissertation provided by Mr. Toner and purported to be maintained at Liverpool University, 1 page.
Bolt, R.A., "Put-that-there: voice and gesture at the graphics interface", Computer Graphics, vol. 14, No. 3 (ACM SIGGRAPH Conference Proceedings) Jul. 1980, pp. 262 270.
DeWitt, Thomas and Edelstein, Phil, "Pantomation: A System for Position Tracking," Proceedings of the 2nd Symposium on Small Computers in the Arts, Oct. 1982, pp. 61-69.
Unknown, JP 2008-210683 article, Japanese language, PW080056, vol. 97, No. 1, Feb. 4, 1997, Information Processing Society of Japan, pp. 1-5.
Unknown, Partial Translation of Ref., "Interactive Video Navigation System by Using the Media Fusion Technique of Video/TV and World Wide Web," 2 pages.
Mohan et al., "Bokode: Imperceptible Visual tags for Camera Based Interaction from a Distance," ACM Transactions on Graphics, Jul. 2009, vol. 28(3), Article No. 98, pp. 1-2.
PCT application No. PCT/US2011/042456, International Search Report and Written Opinion, dated Nov. 4, 2011, 8 pages.
Japanese Application No. 2016-058279, Office Action dated Feb. 14, 2017, 6 pages.
Chinese Application No. 201510087918.9, Office Action dated Mar. 30, 2017, 9 pages.
Chinese Application No. 201310454576.0, Office Action dated May 2, 2017, 18 pages.
U.S. Appl. No. 14/860,239, Notice of Allowance dated Apr. 25, 2017, 9 pages.
U.S. Appl. No. 13/554,963, Notice of Allowance dated Jul. 28, 2017, 8 pages.

* cited by examiner

SUPPLEMENTAL VIDEO CONTENT ON A MOBILE DEVICE

CROSS-REFERENCES

This application is related to U.S. patent application Ser. No. 12/835,645, entitled "OVERLAY VIDEO CONTENT ON A MOBILE DEVICE", filed concurrently herewith, and U.S. patent application Ser. No. 12/835,671, entitled "POSITION DEPENDENT GAMING, 3-D CONTROLLER", filed concurrently herewith, each of which is incorporated by reference herein in their entirety for all purposes.

BACKGROUND

The present invention relates to video display in general and, in particular, to the display of supplemental content on a mobile device. Many movies and other video content on video discs contain additional content. This additional content often includes behind-the-scenes features, actor/director information, outtakes, subtitles, etc. Typically, much of this additional content is only accessible from the opening menu of the disc, and gets played in isolation and appears out of context from the movie.

Currently, some formats allow a portion of this additional content to be placed over the video content during the playing of the video content (e.g., subtitles may be overlaid on the movie while it is being played). However, this overlaid information may interfere with the main picture, and may not be desirable for others watching a movie (e.g., other family members).

Also, in some multiplayer games, it may be desirable for some information to be displayed to only a subset of the players. However, this has traditionally been limited to either online games with multiple players in different locations, or local network games with multiple players within one large location with each player having their own display and device to play the game on. When there is a multiplayer game with a single display in one location, however, the information is typically displayed on the screen for all to see because the group is viewing the same image.

There may, therefore, be a need in the art to allow supplemental content related to video content to be displayed to one or more individual viewers, without displaying the supplemental content to all of those watching the video content on the video display.

SUMMARY

Methods, systems, devices, and software are described for providing supplemental content for display on a mobile device. In one embodiment, a system includes a video display that displays video content (such as a movie or video game). A mobile device with an integrated display may track the video display, and identify the video content in the tracked video display. The mobile device may access supplemental content related to the identified video content, and display the accessed supplemental content on the integrated display.

Thus, users may utilize their mobile devices to see different supplemental content related to video content on a common video display. This supplemental content may include, without limitation, actor information, sports statistics, current video game information or graphics for a specific player, alternate movie or game views, different scenes, extra or bonus features, or similar information.

A mobile device may include an integrated video camera to capture the video content for display with the supplemental content on the integrated display. The video content may include markers formatted to allow the mobile device to track the video display by capturing the marker using the integrated video camera. Markers may be also be formatted to identify the video content and a temporal position within the video content. The supplemental content may further be selected in response to the temporal position of the video content. The supplemental content may be content requested by a user with the mobile device. The video content may be a video played from a video disc player, and the supplemental content may be stored on and accessed from the video disc player. The video content may be a video game, and the supplemental content may be player-specific information for the video game for a user of the mobile device. The supplemental content may be different for different players. The supplemental content may be accessed remotely from a supplemental content datastore, or may be stored locally (e.g., at a console device).

A mobile device may include a video input to capture the video content for display with the supplemental content on the integrated display.

Some embodiments include a method for displaying supplemental content. The position of a video display in relation to a mobile device may be tracked, and the video content displayed on the tracked video display may be identified. Supplemental content may be selected based on the identified video content. The supplemental content may be displayed on the mobile device. There may be markers in the video content formatted to allow the video content to be tracked and identified. The supplemental content may be selected based on the temporal position in the identified video content (e.g., based on the scene in a movie or events occurring in a game).

Still other embodiments relate to the selection of supplemental content for different players in a multi-player game. Video game content displayed on a video display may be identified. The relative position of the video display may be tracked by a first mobile device associated with a first player and tracked by a second mobile device associated with a second player. First player-specific video data may be accessed for the first player, supplemental to and associated with the video game content. The accessed first player-specific video data may be transmitted to the first mobile device for display. Second player-specific video data may be accessed for the second player, supplemental to and associated with the video game content. The accessed second player-specific video data may be transmitted to the second mobile device for display.

The player-specific video data may, for example, be text, animations, or graphic enhancements, and may be displayed on a mobile device distinct from or integrated with the video game content. In some embodiments, the player-specific video data is secret information available to the first player and unavailable to the second player. The player-specific video data may be information selected by a given player, but available to both players.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
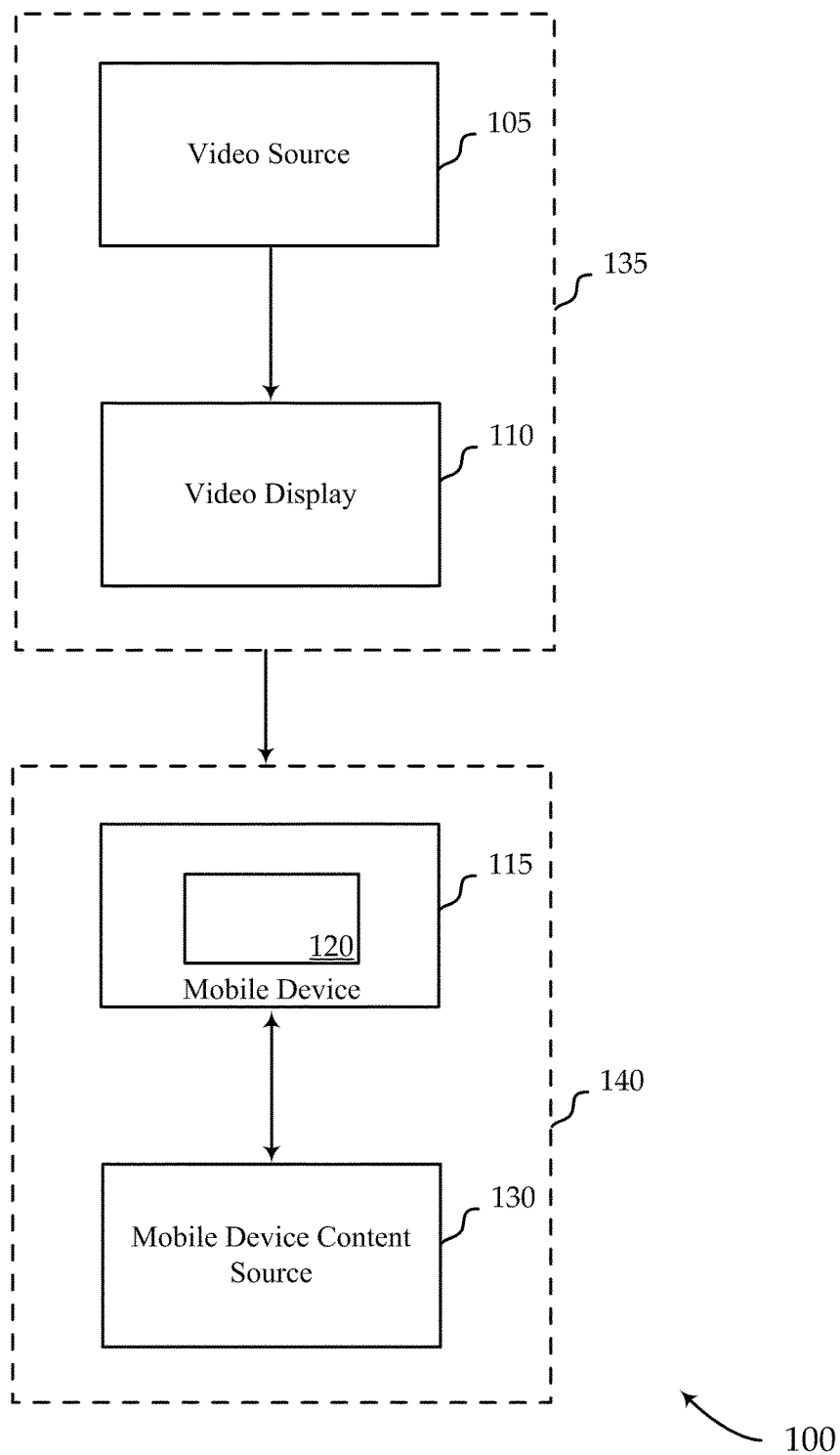
FIG. 1 is a block diagram of a system to provide supplemental content on a mobile device according to various embodiments of the invention.

Methods, systems, and devices are described for providing supplemental content for display on a mobile device. In one embodiment, a system includes a video display that displays video content (such as a movie or video game) from a video source (e.g., a video disc player or video game console). A mobile device with an integrated display may track the video display, and the video content in the tracked video display may be identified. The mobile device may access supplemental content related to the identified video content, and display the accessed supplemental content on the integrated display.

This description provides examples, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Systems, devices, methods, and software are described for the display of supplemental content. In one set of embodiments, shown in FIG. 1, the system 100 includes a video source 105, video display 110, mobile device 115, and mobile device content source 130. Each of these components of the system 100 may be in connection with each other (either directly, wirelessly, via a wired or wireless network, etc.). The mobile device 115 includes an integrated display 120.

The video source 105 may be a video disc player, a video game console, the Internet, a cable headend, or another video source. The video source 105 transmits video content to the video display 110. In some embodiments, the video source 105 and the mobile device content source 130 may be, in whole or in part, the same device or system. As noted, the connection between the video source 105 and video display 110 may be direct, or via a network connection. The video display 110 may be a TV, video monitor (e.g., a liquid crystal display or plasma display), or other video display. The video content may, for example, be a movie, TV show, video game, web content, or other form of video content.

As noted, the mobile device 115 includes an integrated display 120. In some embodiments, the mobile device 115 may also have an integrated video camera (not shown in FIG. 1) which may be an outward facing camera on a mobile device 115, facing the opposite direction from the display. The camera may also face in other directions in relation to the mobile device in order to view video display 110. The mobile device 115 may be a mobile phone, personal digital assistant (PDA), portable video player, portable multimedia player, portable digital video disc (DVD) player, laptop PC, portable game console, game controller, video camera, or other digital electronic device.

As noted, the mobile device 115 accesses supplemental content related to the identified video content. This supplemental content may then be displayed on the mobile device display 120. This supplemental content may include, without limitation, actor information, hints or answers to quiz show questions, sports statistics, fantasy sports league information, current video game information for a player, etc. The supplemental content may also include alternate movie or game views, different scenes, extra or bonus features, promotional items, or similar information. In some embodiments, there may be partially hidden links, challenges to discover the extra content, additional video content-related games, rewards, etc. Trivia questions may be displayed about a movie that a user could ask others. In some embodiments, multiple users can each vote on content, or can input comments on the mobile device 115 that will scroll over other user's mobile devices (whether local or remote users), such as to scroll comments about contestants on a reality TV show. The supplemental content, such as views or angles, may also depend upon the angle of the handheld or other such information.

There are a number of novel aspects specifically for multi-player or single-player with spectator video games, as well. Different players and spectators may see different views of the screen using a mobile device. In one embodiment, players are all looking through the same view on the video display 110, and each may use the integrated display of their mobile device 115 to zoom in on certain features, or access additional or secret information. In this manner, each player may get a different, player-dependent view of the video game content.

In some embodiments, only the supplemental content is displayed on the mobile device display 120. In other embodiments, the integrated video camera (not shown) may capture the video content from the video display 110. In yet other embodiments, video content may be captured from output cables (e.g. High-Definition Multimedia Interface (HDMI) cables) directly from video source 105. The mobile device 115 may access the supplemental content, and display the accessed supplemental content over, or adjacent to, the video content captured from the video display 110 on the mobile device display 120.

To track the video display 110, any number of different techniques may be used. For example, if the mobile device 115 has an integrated camera, the mobile device 115 may identify the size of the video content, and the position and orientation of the video content relative to the mobile device (or position and orientation of the mobile device 115 relative to the video display 110). In some embodiments, the video content displayed on the video display 110 includes one or more markers formatted to allow the mobile device 115 to track the video content within the captured video data (and thereby track the video display 110 location using a video camera). The marker may be placed in the corners of the video content, and could be a pattern of dots or squares (akin to a barcode). A variety of on-screen markers may be used (e.g., codes, graphics, numbers, letters, digital watermarks, or encoded images). Encoded audio may also be used to serve as markers. The video display 110 itself, or attachment thereto, may also serve as a marker.

The markers may have other functionality, alternatively or in addition to serving as anchors for tracking. Each pattern in a marker may represent a different value, such as a different binary representation. There may be one or more values associated with each marker in video content. The mobile device 115 may capture video content, locate the marker, and identify the value. Therefore, the video content displayed on the video display 110 may include a marker identifying the video content. The mobile device 115 may identify the video content based on markers, and the supplemental content (e.g., text, animations, graphic enhancements (e.g., 2D or 3D enhancements), advertisements, hyperlinks, and other information) may be selected based on an identification of the video content.

Some of the values associated with video content may change in a given marker over time. The video content displayed on the video display 110 may therefore include a marker identifying the temporal position within particular video content (e.g., illustrating the time elapsed for a movie, or the situation for a particular game). Since video changes over time, a time code may allow the supplemental content to be synchronized with the movie or other video content. The mobile device 115 may process the marker to identify the temporal position within the video content. The supplemental content may be selected in response to the temporal position of the video content (e.g., tied to particular scenes, actors, etc.). Thus, the pattern or the marker may change over time to show time progression, status, game situation, or other time-variable indicators. This may allow a mobile device 115 to get a tight synchronization with the video content on the video display 110 or directly through output cables. There may, but need not, be communication between the video source 105 and mobile device 115 for purposes of synchronization. Codes could update at a variety of rates, by way of example: 24 frames per second, or every ¼ second, every three seconds, etc., up to 10-15 seconds or more, depending upon the type of information to be displayed. The mobile device 115 may know the intervals in advance, so once there is synchronization, the mobile device 115 may only need to perform search processing at the intervals.

In other embodiments, the video source 105 may identify the video content and/or the temporal position of the video content (instead of having this information conveyed through the markers). The video source 105 may transmit this information (identifying the video content and/or temporal position) to the mobile device 115 or mobile device content source 130. This information may then be used by the mobile device 115, mobile device content source 130, or combination thereof, to synchronize the supplemental content with the video content displayed on the video display 110. Therefore, in various embodiments, an identification source 135 (which may be the video source 105, the video display 110, or a combination thereof) may transmit and/or display information to be received or captured by an identification receiver 140 (which may be the mobile device 115, the mobile device content source 130, or combination thereof). This information may identify the video content, the temporal position of the video content, or any combination thereof.

Figure 2:
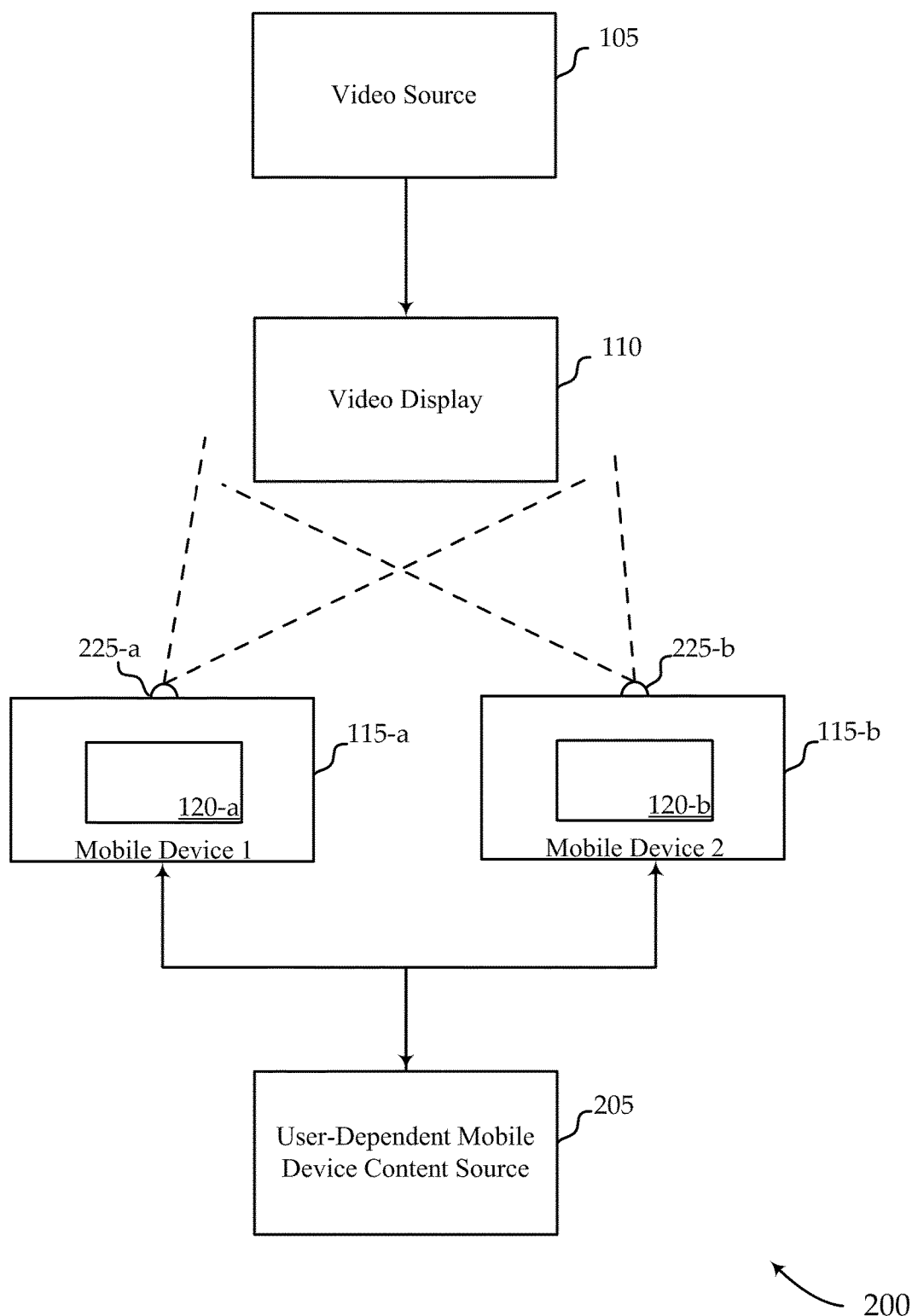
FIG. 2 is a block diagram of a system to provide supplemental content to mobile devices according to various embodiments of the invention.

In another set of embodiments, shown in FIG. 2, a system 200 includes a video source 105, video display 110, and mobile devices 115-*a* and 115-*b*, and a user-dependent mobile device content source 205. This system 200 may be an example of the system 100 of FIG. 1. Each mobile device 115 includes a display 120 and a video camera 225. The user-dependent mobile device content source 205 may be the video source 105 of FIG. 1.

Consider an example wherein the video source 105 is transmitting a video game for display over the video display 110 to multiple players. The video cameras 225 each capture video data, and the video data includes the video game from the video display 110. The mobile devices 115 each track the video display using markers in the video game content. Each mobile device 115 receives supplemental content from the user-dependent mobile device content source 205. This supplemental content may be secret player-specific information that is only available only to each respective player. By displaying the secret supplemental content only on a particular player's mobile device 115 (and not on the video display 110), the secrecy of the information can be maintained. In another embodiment, this supplemental content may be information requested by a player via the mobile device 115. This specifically requested information (e.g., an alternative view of the game, instructions, in-depth player-specific information, etc.) may be displayed on a particular player's mobile device 115 (and not on the video display 110).

In one embodiment, the video source 105 and user-dependent mobile device content source 205 together make up a single video game console device. In other embodiments, the video source 105 may be a console device, and the user-dependent mobile device content source 205 may be a remote server. In still other embodiments, the video source 105 and the user-dependent mobile device content source 205 may each be the same remote server (or different remote servers). The supplemental information may displayed on the mobile device display 120 without the captured video game content, in a separate part of the screen from the video game content, or overlaid or otherwise integrated with the video content.

Consider an alternative example wherein the video source 105 is transmitting a TV program for display over the video display 110. Each video camera 225 may capture video data, and the video data includes the TV program from the video display 110. The mobile devices 115 each track the video display using markers in the TV program content, and further use the markers to identify the TV program and temporal position therein. Each mobile device 115 user may request supplemental content (e.g., using their respective mobile devices 115 to communicate with the user-dependent mobile device content source 205 (whether local or remote)). Each mobile device 115 may receive supplemental content from the user-dependent mobile device content source 205. This supplemental content may be actor information, sports statistics, fantasy sports league information, alternate views, trivia information, hyperlinks to show related information, etc. By displaying the supplemental content only on a particular requesting user's mobile device 115 (and not on the video display 110), user-dependent information about the TV program may be accessed without cluttering the video display 110. The supplemental information may be displayed on the mobile device display 120 without the captured TV program content, in a separate part of the screen from the TV program content, or overlaid or otherwise integrated with the TV program content.

Figure 3:
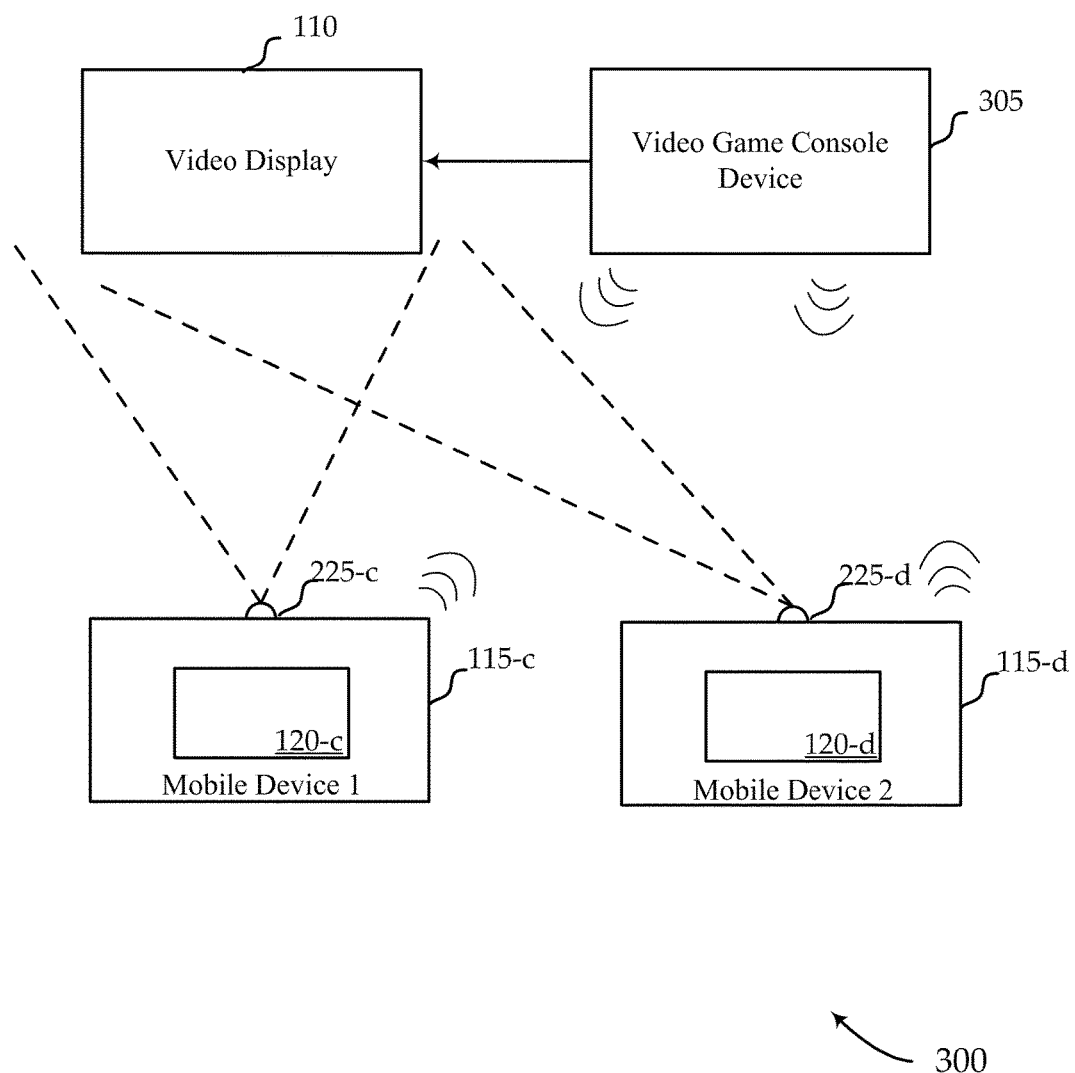
FIG. 3 is a block diagram of a system to provide supplemental content to mobile devices delivered from a console device according to various embodiments of the invention.

In another set of embodiments, shown in FIG. 3, a system 300 includes a video game console device 305, a video display 110, and mobile devices 115-c, 115-d. This system 300 may be an example of the system 100 of FIG. 1. The console device 305 may be the video source 105 and mobile device content source 130 of FIG. 1. In one embodiment, the video game console device 305 is directly connected with the video display 110, and in wireless communication with the mobile device 115. The mobile devices 115 each include a display 120 and a video camera 225.

Consider an example wherein the video game console device 305 is playing a video game from a video game disc, and transmitting the video game from the disc for display over the video display 110. The video cameras 225 may each capture video data, and the video data includes the video game content from the video display 110. The mobile devices 115 each track the video display 110 using markers in the video game content. The mobile devices 115 each receive supplemental content wirelessly from the video game console device 305, and display the accessed supplemental content on their respective displays 120.

Thus, in some embodiments, the video game console device 305 has supplemental content (which may be from the video game disc itself, or accessed remotely over a network). Because the video game console device 305 provides both the video content to be displayed and the supplemental content, this may facilitate the identification of the supplemental content (e.g., without the use of markers). In some embodiments, a player may use the mobile device 115 to control or otherwise select the particular type of supplemental content to be displayed on a mobile device display 120. This content may be secret, player-specific information, or may simply be supplemental content requested by a player. The supplemental information may be displayed on the mobile device display 120 without the captured video game content, in a separate part of the screen from the video game content, or overlaid or otherwise integrated with the video game content.

Figure 4:
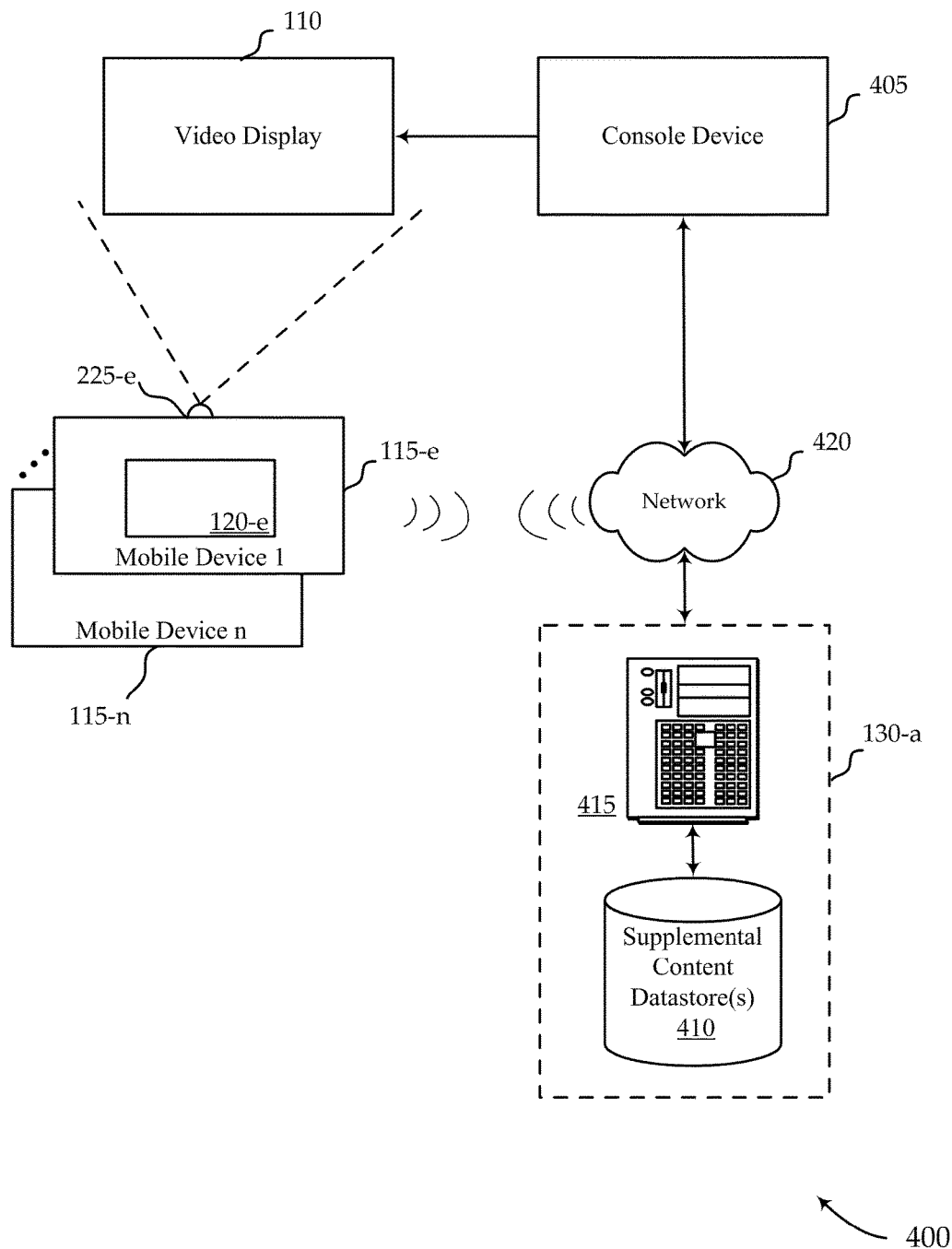
FIG. 4 is a block diagram of a system to provide supplemental content to a mobile device delivered from a supplemental content datastore according to various embodiments of the invention.

In another set of embodiments, shown in FIG. 4, a system 400 includes a console device 405, a video display 110, mobile devices 115, a network 420, supplemental content datastore(s) 410, and a supplemental content server 415. This system 400 may be an example of the system 100 of FIG. 1 (e.g., supplemental content datastore(s) 410 and supplemental content server 415 may be a mobile device content source 130-a, such as the mobile device content source 130 of FIG. 1; the console device 405 may be the video source 105 of FIG. 1). In one embodiment, the console device 405 is directly connected with the video display 110. The mobile devices 115 may be wirelessly connected to a network 420, and in communication with supplemental content datastore(s) 410 and supplemental content server 415 through the network 420. The console device 405 may be in communication with the network 420, and in communication with supplemental content datastore(s) 410 and supplemental content server 415 through the network 420.

In one example, the console device 405 is playing a video game or movie, and transmitting video content for display over the video display 110. Each video camera 225 captures video data, and the video data may include the video content from the video display 110. Each mobile device 115 tracks the video display 110 (e.g., using captured video data). Each mobile device 115 receives supplemental content via the network 420 from supplemental content datastore(s) 410 and supplemental content server 415. Each respective mobile device 115 displays the supplemental content on the mobile device display 120. The supplemental content may be player-specific video content (e.g., secret information or views specific to a particular player and transmitted only to that player's mobile device 115), or other user-dependent video content (e.g., user-requested information or content related to a movie or TV show).

The supplemental content is related to the video content, or selected in response to the video content. For example, in some embodiments, the supplemental content is an advertisement (e.g., text, animations, graphics, hyperlinks, or other information) that is selected based on the video content. In some embodiments, the video content may be known, but the temporal position may be unknown. The supplemental content server 415 may deliver non-time specific supplemental content to each mobile device 115.

In still other embodiments, the supplemental content server 415 may identify the temporal position of the video content. This may be learned via communication with the console device 405, or a mobile device 115 (e.g., a mobile device 115 may transmit information to the supplemental content server 415 from the markers discussed in more detail elsewhere). The supplemental content server 415 accesses the supplemental content datastore(s) 410 to retrieve supplemental content related to the video content being captured by a mobile device 115. This content may be delivered to the mobile device 115 for display during time-specific portions of the video content. It is also worth noting that supplemental content may be pre-loaded onto the mobile device 115 (e.g., from local or remote storage, such as the supplemental content datastore(s) 410).

The supplemental content server 415 may include one or more server computers, workstations, web servers, or other suitable computing devices. The supplemental content server 415 may be fully located within a single facility or distributed geographically, in which case a network may be used to integrate different components.

Figure 5:
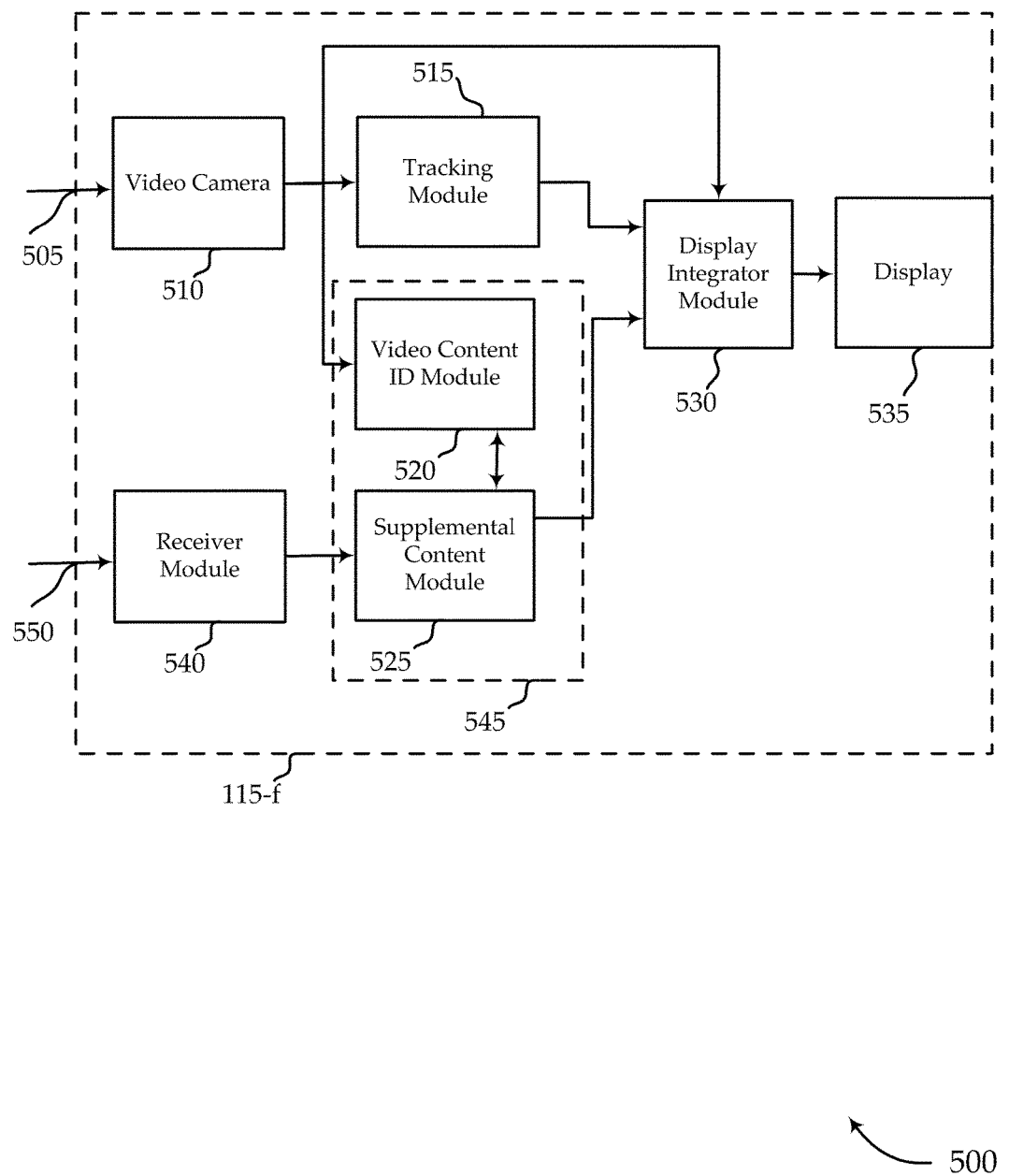
FIG. 5 is a block diagram of a mobile device configured to display supplemental content with captured video content according to various embodiments of the invention.

FIG. 5 is a block diagram 500 illustrating a mobile device 115-f for the display of supplemental content according to various embodiments of the invention. This may, but need not be, the mobile device 115 of FIG. 1, 2, 3, or 4. The mobile device 115-f may include a video camera 510, tracking module 515, video content ID module 520, supplemental content module 525, display integrator module 530, display 535, and receiver module 540. In some embodiments, a mobile device 115-f may include only a subset of these components, and it is further worth noting that some of the functionality discussed may be performed by other devices in communication with the mobile device 115-f.

All or part of the functionality of each component may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions may also be implemented, in whole or in part, with instructions embodied in a memory, formatted to be executed by one or more general or application-specific processors.

Video content 505 being displayed on a TV, or other display device, may be captured by the video camera 510. The tracking module 515 may track the video display by analyzing the video content within the captured video. The tracking module 515 may track the video display by identifying the size and location of the video content within the captured video data, and the position and orientation of the video display relative to the mobile device 115-f. This tracking may be performed using the markers discussed elsewhere herein.

Video can also be captured directly from output ports using cables connected to the output ports of the source. Captured video may be in analog, digital, or hybrid analog/digital formats. Captured video may be fed directly to the tracking module 515, bypassing the video camera 510.

The video content ID module 520 may decode the markers, or otherwise identify the video content (directly through the captured video content, or via other means). In some embodiments, the video content ID module 520 also identifies the temporal position of the video content. The supplemental content module 525 accesses supplemental content. The accessed supplemental content is selected in response to the identified video content, and further may be tied to the temporal position within the video content. In some embodiments, there are a number of supplemental content options at a given temporal position, and these may be selectable by the user of the mobile device 115-f. The video content ID module 520 and the supplemental content module 525 may be an integrated module 545; alternatively, some or all of this functionality may be located off the mobile device 115-f (see, e.g., the discussion of the supplemental content datastore(s) 410 and supplemental content server 415 of FIG. 4). The tracking module 515 can also be located off the mobile device 115-f. Thus, the receiver module 540 of the mobile device 115-f may receive supplemental content 550 (in advance or in real-time). This supplemental content may be received from a local console device (e.g., video game console device 305 of FIG. 3) or from a local or remote supplemental content datastore (e.g., datastore 410 of FIG. 4).

The display integrator module 530 receives the video captured by the video camera 510, or through direct output cables from the video source, and information on location, size, position, and/or orientation of the video content from the tracking module 515. The display integrator module 530 receives the supplemental content from supplemental content module 525. The display integrator module 530 may scale and orient the supplemental content. The display integrator module 530 may provide supplemental content for display without the captured video content, in a separate part of the screen from the video game content, or overlaid or otherwise integrated with the video content. For example, the display integrator module 530 may overlay the accessed supplemental content over the video content, and forward the integrated video to the display 535.

There is a variety of supplemental content that may be provided, including actor identification and information, location background, trivia, player statistics, fantasy information, quizzes, hidden "easter eggs" to be discovered, links to multiple angles, secret player-specific game information, and any other bonus features. These may be in the form of text, animations, graphic enhancements (e.g., 2D or 3D enhancements), advertisements, hyperlinks, etc.

Figure 6:
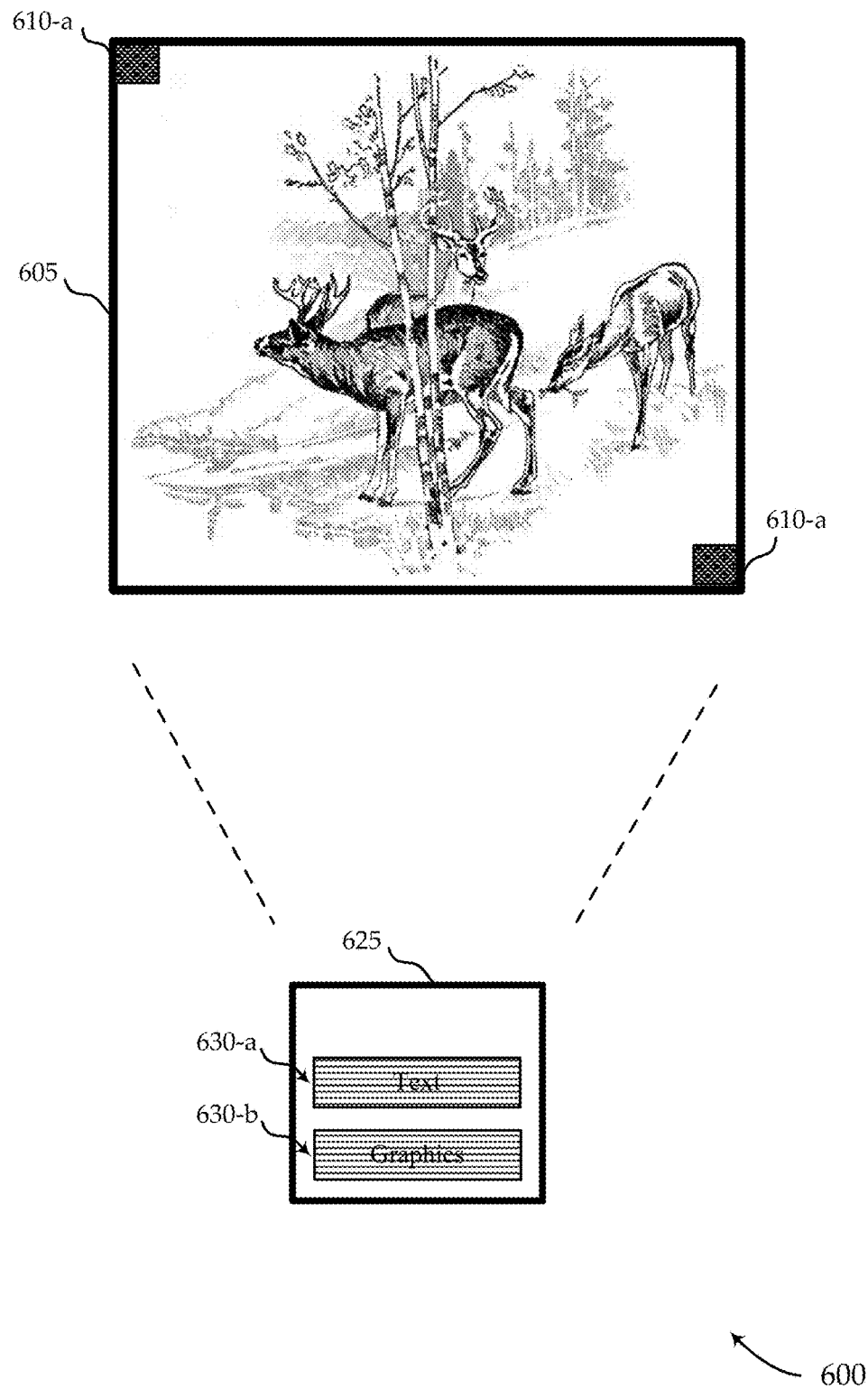
FIG. 6 is a block diagram illustrating the display of supplemental video content on a mobile device according to various embodiments of the invention.

Turning to FIG. 6, an example set of images 600 illustrating various displays are used to show various novel aspects. Assume that image 605 is video content on a display (e.g., the video display 110 of FIG. 1, 2, 3, or 4). In the image 605, there are markers 610 placed in certain corners. As noted above, the markers 610 may be a pattern of dots or squares (akin to a barcode). However, in other embodiments, a variety of on-screen markers may be used (e.g., codes, graphics, numbers, letters, digital watermarks, or encoded images). The markers 610 may have other functionality, alternatively or in addition to serving as anchors for tracking. Each pattern in a marker 610 may represent a different value, such as a different binary representation. There may be one or more values associated with each marker 610 in video content, and the markers may be changed over time to identify temporal position in addition to content.

Image 625 illustrates an image generated for display on a mobile device (e.g., integrated display 120 of mobile device 115 of FIG. 1, 2, 3, or 4), while images 630 (within image 625) illustrate the supplemental content. In the illustrated embodiments, image 630-a represents text, and image 630-b represents graphics. The markers 610 may be processed to track the video display, and may further be processed to identify the video content and the temporal position therein. Based on one or more of the aforementioned factors, supplemental content 630 may be selected. As noted previously, the supplemental content may be text, animations, graphic enhancements (e.g., 2D or 3D enhancements), advertisements, hyperlinks, and so on. Using a mobile device, a user may see supplemental content related to video content on a video display. This supplemental content may include, without limitation, actor information, sports statistics, current video game information for a player, alternate movie or game views, different scenes, extra or bonus features, or similar information. The supplemental content may automatically appear in some embodiments, while in other embodiments the content is user-selectable.

There may be games related to video content that can be played using mobile devices. For example, there may be questions or polls related to the video content. Each player may input answers, and get scored on how well they guessed or answered trivia. The scores may be uploaded at the end. For live sporting events, certain codes may be displayed (e.g., during the huddle, at the free throw line, in the batter's box) to allow users to attempt to predict the play or result. Winning a game or getting a certain score also may unlock or win content, such as downloads. In some embodiments, there may be hidden aspects on the common display that may be accessed using the mobile device. Also, users may provide inputs related to the video content to their mobile devices (e.g., text or drawing), and the input may show up on other user's mobile devices (locally or remotely).

There may be many different viewing angles, device focal lengths, and screen sizes available as supplemental content. The supplemental content may be a scaled up, rendered version of the video content on the common video display—such as to fill the whole display of the mobile device, even if the captured image would only otherwise take up half the screen. The supplemental content may include video content processed with image stabilization technology to keep the basic display image from shifting in the mobile device.

The supplemental content may be tied to an electronic retailer that provides links to purchase items shown in a scene. For product placement in a movie, a mobile device may be used to click on an item to purchase the item, go to the product website, etc. Different versions of the supplemental content may appear by moving around the room, tilting the device, etc.

Figure 7:
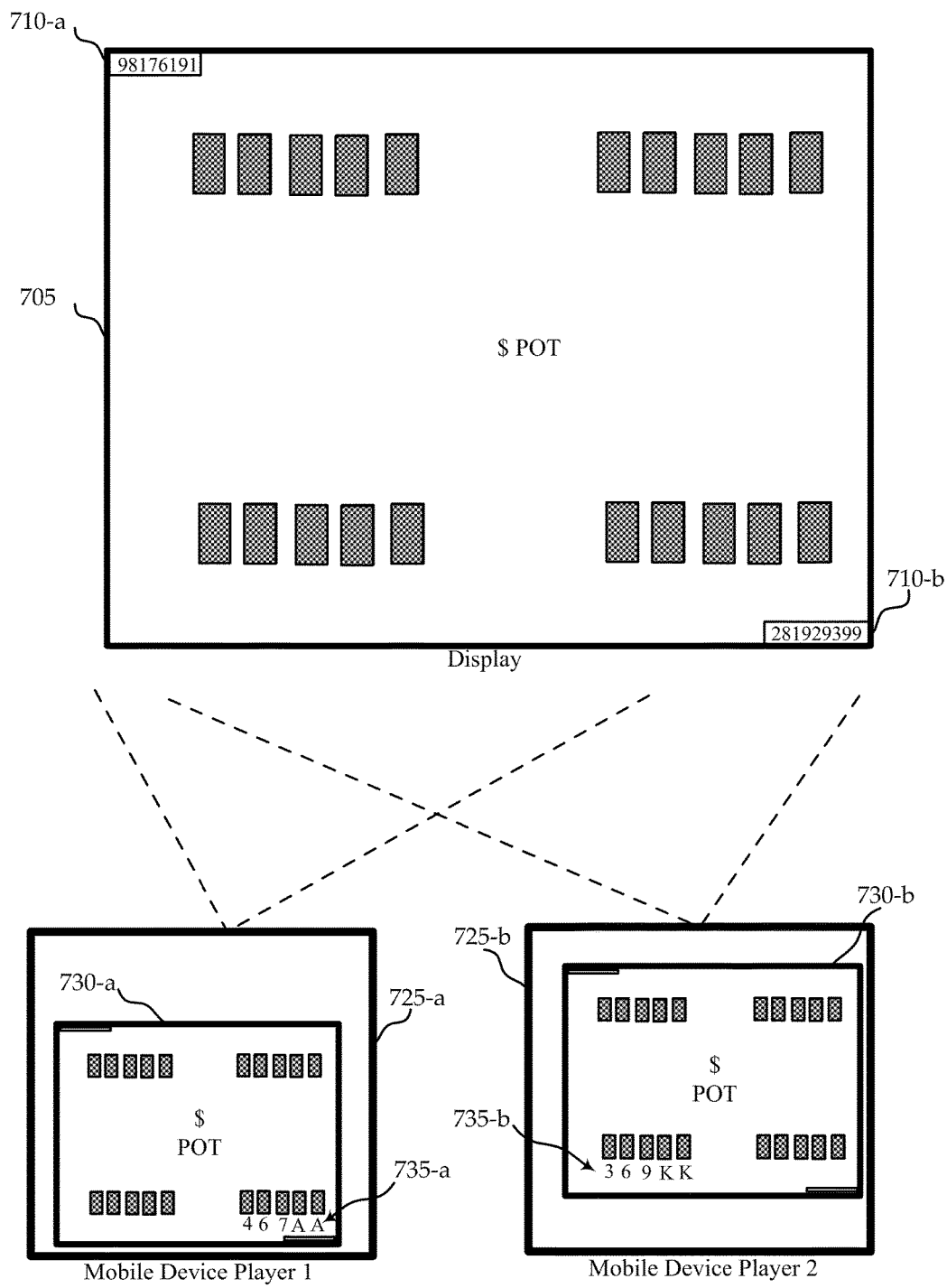
FIG. 7 is a block diagram illustrating various displays of supplemental content overlaid on a video game according to various embodiments of the invention.

Turning to FIG. 7, an example set of images 700 illustrating various displays are again used to show various novel aspects. Assume that image 705 is video card game on a display (e.g., the video display 110 of FIG. 1, 2, or 3). In the image 705, there are markers 710 identifying binary codes placed in certain corners. As noted above, the markers 710 may, in other embodiments, be a variety of different screen markers. The markers 710 may have other functionality, alternatively or in addition to serving as anchors for tracking. Each marker 710 may represent a different value to identify video content, and markers 710 may change over time as well.

Images 725-a and 725-b illustrate captured video for different mobile devices (e.g., mobile device 115 of FIG. 1, 2, 3, 4, or 5): image 725-a is the image generated for player 1, image 725-b is the image generated for player 2. Images 730-a and 730-b illustrate a portion of the captured video game content from a video display (i.e., a portion of captured image 705). The markers 710 may be processed to track images 730-a and 730-b within images 725-a and 725-b, respectively. Images 735-a and 735-b illustrate how different supplemental content may be provided to different players as overlay content. For example, compare the position of supplemental content 735-a with supplemental content 735-b. Image 735-a discloses the cards for player 1 (but player 2's cards are not shown anywhere in the rest of image 725-a); image 735-b discloses the cards for player 2 (but player 1's cards are not shown anywhere in the rest of image 725-b). This illustrates how secret views for the players may be maintained. In addition to providing different player-specific supplemental content, supplemental content may be based on user selections and/or on viewer angles. For example, different users may specify (through pre-selected preferences or real-time selection) which type of supplemental content they would like to receive.

Thus, a mobile device may be used to synchronize with video game content on a display, and show different player-specific views of a game. Player-specific game information may be rendered by, or received by, the mobile device. In some embodiments with a secret view, player specific information is rendered by and received by the mobile device. Thus, a "secret view" for each player in a multi-player or co-op game may be provided to each player's respective mobile device. Each person may see their own version of the game, while a common display shows the non-secret, public information. In a quiz game, a player may select or enter an answer, without the other playing being able to see the answer. In a turn-based word game, a first player may see what letters he is entering, to ensure the answer is being spelled correctly, but might not want to allow the other player(s) to see the letters, as those other players might get hints from the answer. In a sports game, plays may be entered secretly via the mobile device. In battle games, a weapon may be selected secretly by a player. This functionality may be used to allow players to share a common video display, while entering or seeing some information out of view from other players. In some embodiments, players may be on the same team (e.g., a driver and a gunner)—the common display may provide a view of where the vehicle is going, but each player could have role specific views on their respective mobile devices.

In some embodiments, therefore, the mobile device may need to know what is going on in the game, and may receive this information from a console (e.g., from console device 305 of FIG. 3) or over a network (e.g., from supplemental content server 415 of FIG. 4). This information could be imparted via markers in the video game content. A mobile device may be configured only to receive information, or may be configured to transmit user selection to control aspects of the game.

Figure 8:
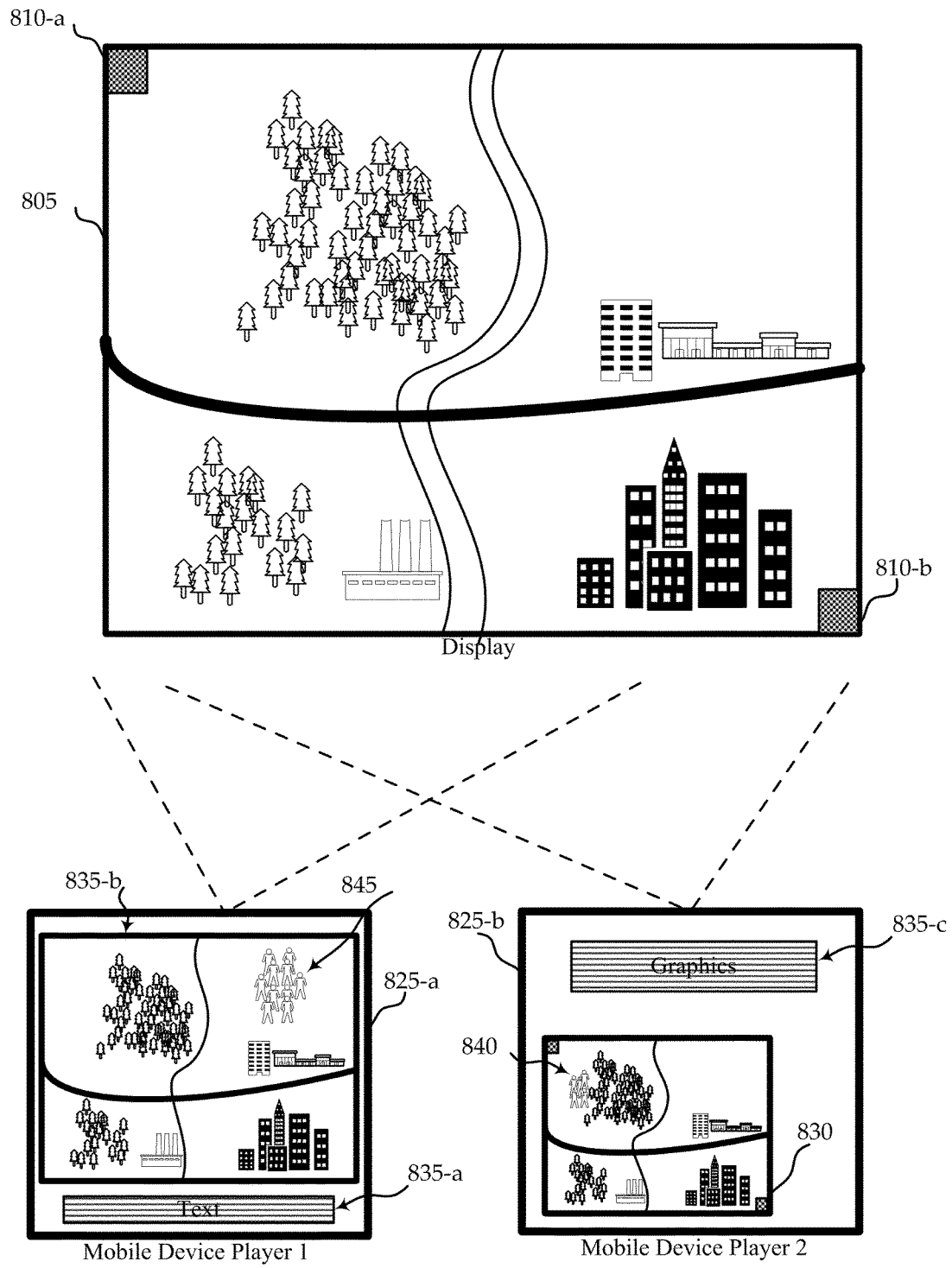
FIG. 8 is a block diagram illustrating various displays of supplemental content for a video game according to various embodiments of the invention.

Turning to FIG. 8, an example set of images 800 illustrating various displays are again used to show various novel aspects. Assume that image 805 is a video game on a display (e.g., the video display 110 of FIG. 1, 2, 3, or 4). In the image 805, there are markers 810 identifying binary codes placed in certain corners. The markers 810 may have other functionality, alternatively or in addition to serving as anchors for tracking. Each code 810 may represent a different value to identify video content, and codes may change over time as well, to identify video content and timing.

Images 825-a and 825-b illustrate the display for different mobile devices: image 825-a is the image generated for player 1, image 825-b is the image generated for player 2. Image 825-a includes a rendered image 835-b of image 805 (as opposed to a captured image of image 805). Image 835-b also includes supplemental content 845 for player 1, showing the location and number of members on player 1's team for the game (overlaid on rendered image 835-b). Image 825-a also includes supplemental content made up of text 835-a related to the game for player 1.

Image 825-b includes a captured image 830 of image 805 (as opposed to a rendered image of image 805). The captured image may be from a video camera (e.g. video camera 510) or directly from output cables from the video source. Image 830 also includes supplemental content 840 for player 2 (which is overlaid on the captured image 830), showing the location and number of members on player 2's team for the game. Image 825-b also includes supplemental content made up of graphics 835-c including additional information related to the game. Images 825-a and 825-b illustrate how different supplemental content may be provided to different players.

It is worth noting that there are a number of ways to track a video display, identify the video content, and/or identify the temporal position therein. For example, in some embodiments, a mobile device (e.g., mobile device 115 of FIG. 1, 2, 3, 4, or 5) may have a low-resolution version of a movie, and search for those frames in order to sync to the movie. A hash of a low-resolution version of the movie may be stored at the device, and the device may perform image matching.

In other embodiments, an "invisible" watermark may be embedded in the video stream to provide for tracking and/or content identification. A digital watermark embedded in the content may be captured by a mobile device, and used to track the video content. The watermark may be in select, predictable areas of the screen, or across the entire screen to facilitate tracking to determine the outline of the screen in the image. In one embodiment, there are two watermarks, or mark portions, on the screen—one that corresponds to the anchor (e.g., a static mark that may be around or near the edge and stable), and one that corresponds to the code (e.g., changing over time—a modulated mark).

In some embodiments, the tracking and content identification may be embedded in the image. A Fourier transform of all or part of the scanned image may be performed, and the frequencies across the image analyzed. Information may be encoded in portions of the image not perceptible to humans (e.g., very high frequency images). Information may be embedded that relates to a watermark (e.g., defining the location of a watermark), or is independent from any watermark.

In still other embodiments, the tracking and content identification may be embedded in subtitles, logos, or other images. The information may also be in the sidebands of the audio, encoded at frequencies not perceptible to the human ear, but that can be detected using, for example, a Fourier transform. Combinations of image data and audio data may be used for tracking and capture as well. It is again worth noting that markers may be used to track the display, identify video content, or identify a temporal position.

The markers may not be needed in each embodiment, as a mobile device may recognize and track the display in other ways (e.g., based on knowing a model and/or size of the display). In some embodiments, a sensor bar, stickers, or other attachments may be used to track the display. Moreover, the video content need not be identified with the markers, but through other means. For example, the video content and/or temporal position may be identified by the video source 105 of FIG. 1, and the supplemental content may be selected based thereon. Or the video game content may be identified by the video game console device 305 of FIG. 3, to thereby ensure that the supplemental content is synchronized with the video game content. A number of additional examples will, in light of this disclosure, be evident to those skilled in the art.

It is again worth noting that the supplemental content may be downloaded in advance of when the video content is displayed (e.g., through a download store, or by copying content from the movie's video disc). Alternatively, some console devices may stream the supplemental content to a mobile device over a wireless connection during the playback of the content and thus avoid preloading the portable device with the content. In still other embodiments, the overlay content may be streamed from a network.

Figure 9:
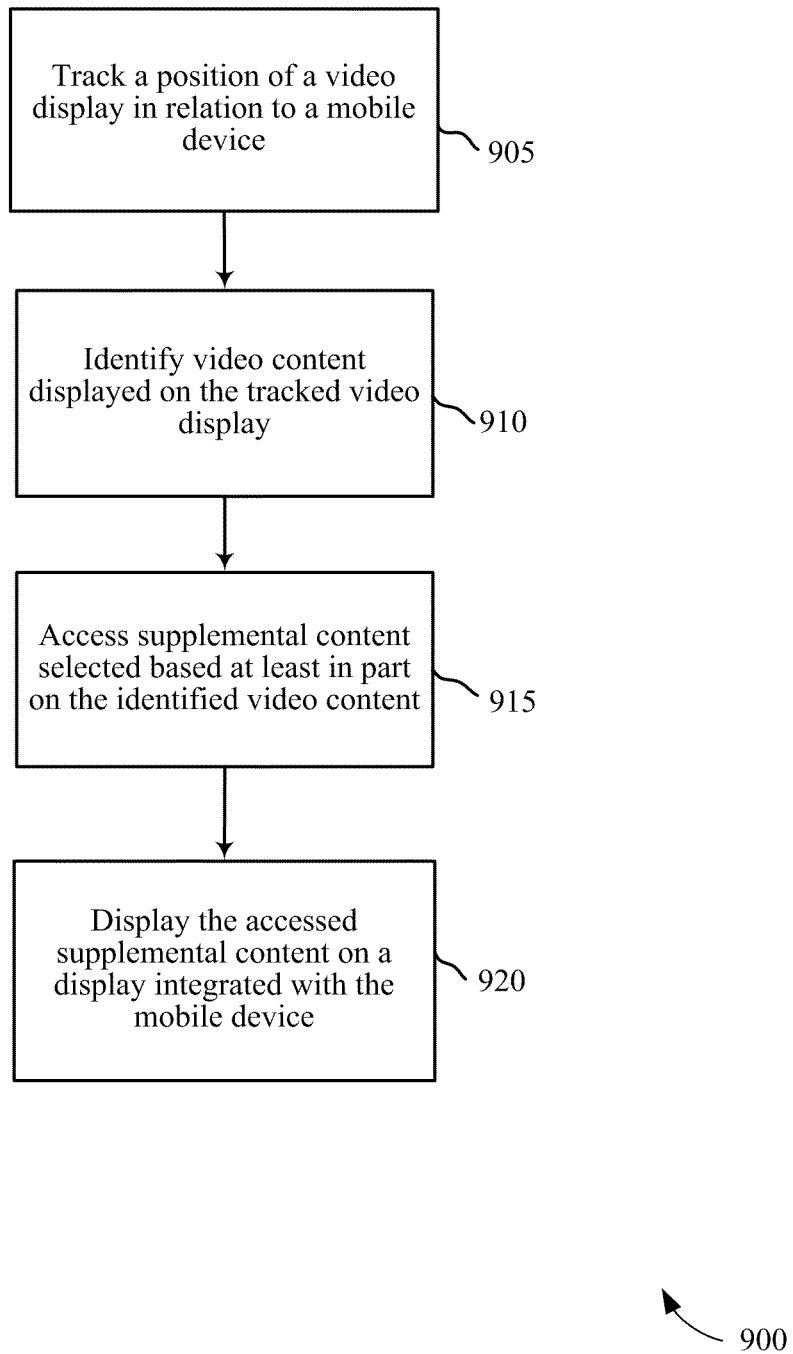
FIG. 9 is a flow chart of a process to provide supplemental content on a mobile device according to various embodiments of the invention.

Referring next to FIG. 9, a flow chart is shown illustrating a method 900 to provide supplemental content on a mobile device according to various embodiments of the invention. This method 900 may, for example, be performed in whole or in part by the system 100, 200, 300, or 400 of FIG. 1, 2, 3, or 4, or more specifically, by the mobile device 115 of FIG. 1, 2, 3, 4, or 5, the video game console device 305 FIG. 3, the console device 405 of FIG. 4, the supplemental content server 415 of FIG. 4, and/or any combination thereof.

At block 905, the position of a video display is tracked in relation to a mobile device. This can be accomplished through a video camera, a wireless position determination system, inertial reference units, etc. At block 910, the video content displayed on the tracked video display is identified. At block 915, supplemental content is accessed, the supplemental content selected for access based at least in part on the identified video content. At block 920, the accessed supplemental content is displayed on the integrated display of the mobile device.

Figure 10:
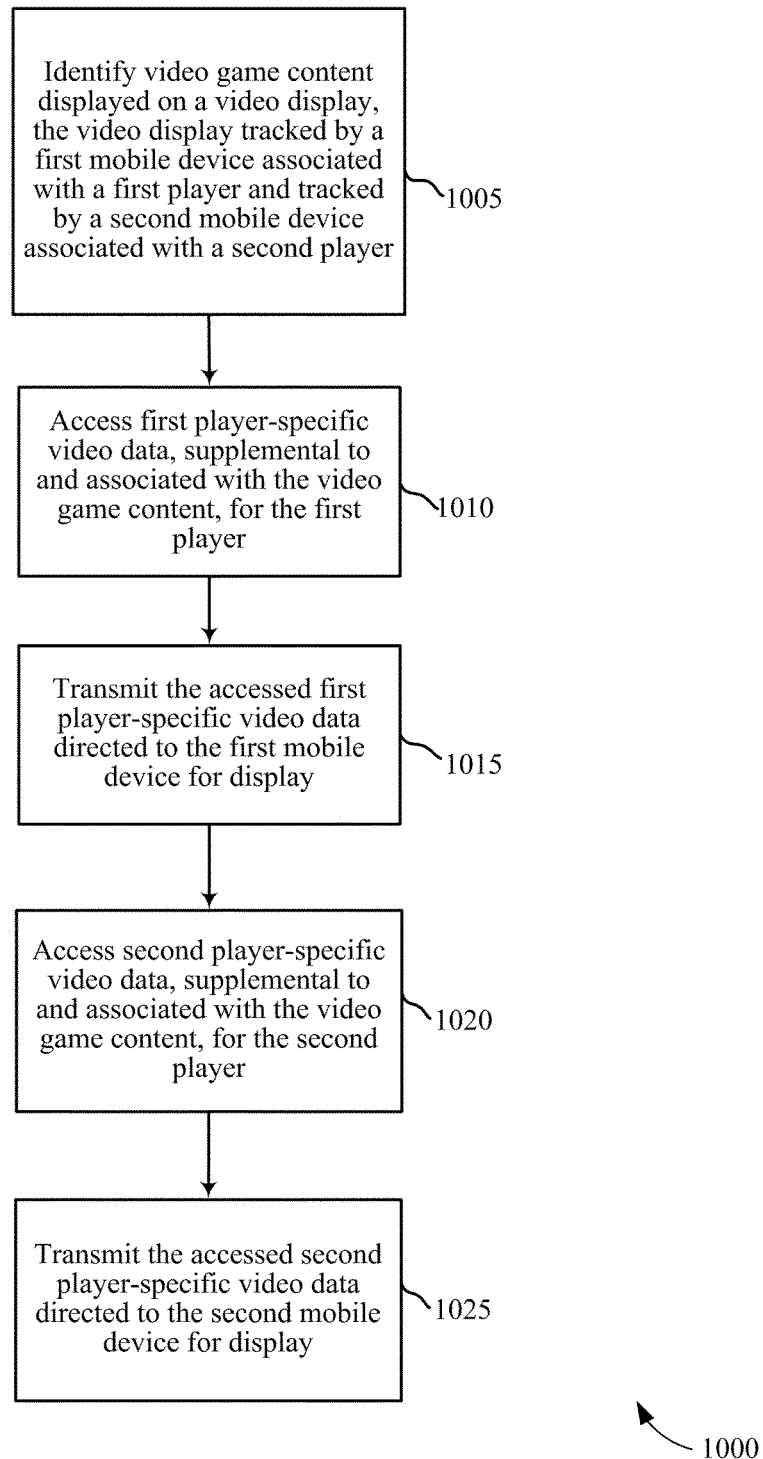
FIG. 10 is a flow chart of a process to identify supplemental content for display on a mobile device according to various embodiments of the invention.

Referring next to FIG. 10, a flow chart is shown illustrating a method 1000 to identify supplemental content for mobile devices according to various embodiments of the invention. This method 1000 may, for example, be performed in whole or in part by the system 100, 200, 300, or 400 of FIG. 1, 2, 3, or 4, or more specifically, by the mobile device content source 130 of FIG. 1, the user-dependent mobile device content source 205 of FIG. 2, the video game console device 305 of FIG. 3, the console device 405 of FIG. 4, the supplemental content server 415 of FIG. 4, and/or any combination thereof.

At block 1005, video game content on a video display is identified, the video display tracked by a first mobile device associated with a first player and tracked by a second mobile device associated with a second player. At block 1010, first player-specific video data is accessed, supplemental to and associated with the video game content, for the first player. At block 1015, the accessed first player-specific video data is transmitted to the first mobile device for display. At block 1020, second player-specific video data is accessed, supplemental to and associated with the video game content, for the second player. At block 1025, the accessed second player-specific video data is transmitted to the second mobile device for display.

In some embodiments (not shown), the player-specific video data may be text, animations, or graphic enhancements, and may be displayed on a mobile device distinct from or integrated with the video game content. In some embodiments, the player-specific video data is secret information available to the first player and unavailable to the second player. The player-specific video data may be information selected by a given player, but available to both players.

Figure 11:
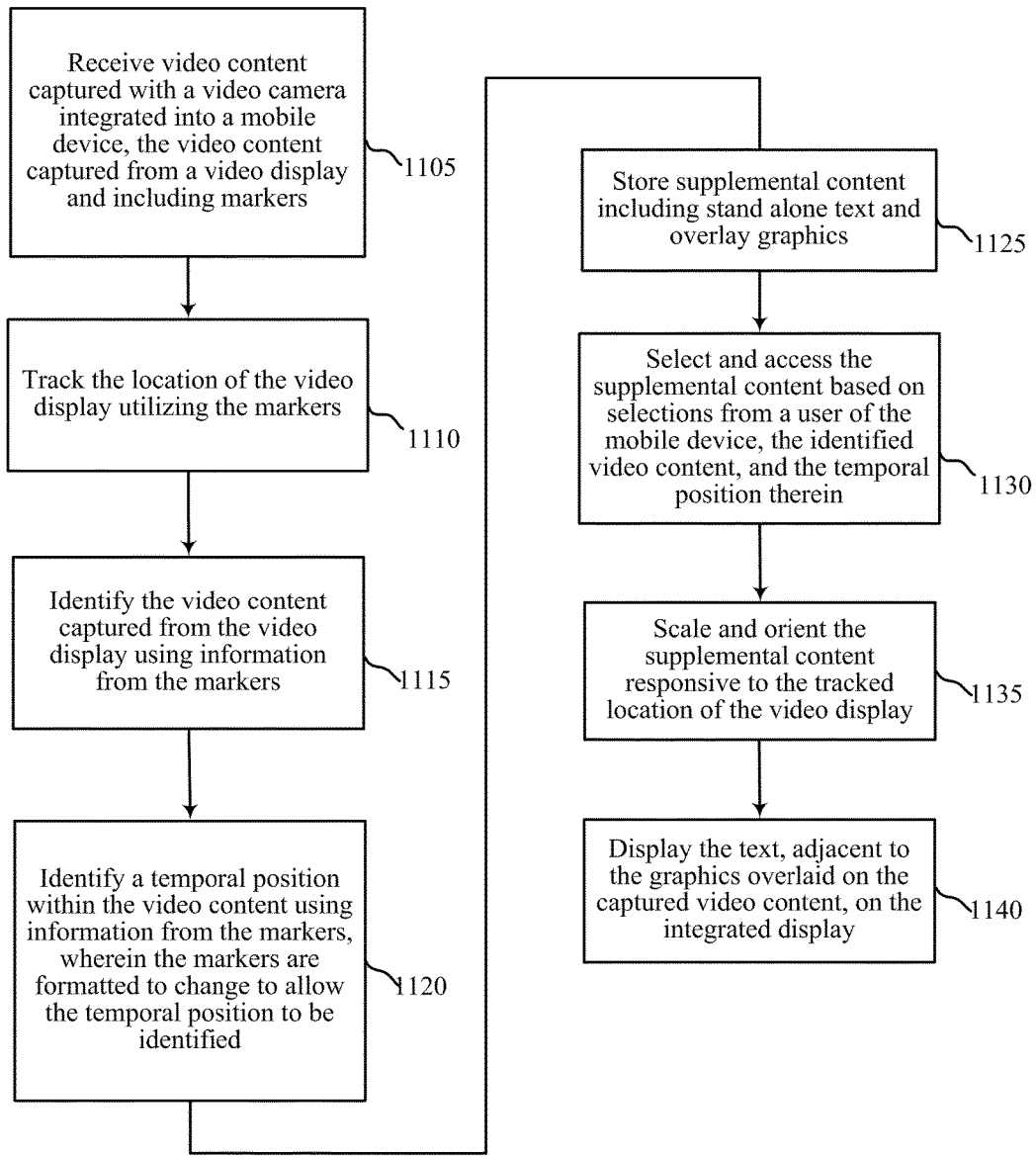
FIG. 11 is a flow chart of an alternative process to identify supplemental content for display on a mobile device according to various embodiments of the invention.

Referring next to FIG. 11, a flow chart is shown illustrating a method 1100 to identify supplemental content for display on a mobile device according to various embodiments of the invention. This method 1100 may, for example, be performed in whole or in part by the system 100, 200, 300, or 400 of FIG. 1, 2, 3, or 4, or more specifically, by the mobile device 115 of FIG. 1, 2, 3, 4, or 5, the video game console device 305 of FIG. 3, the console device 405 of FIG. 4, the overlay content server 415 of FIG. 4, and/or any combination thereof.

At block 1105, video content captured with a video camera integrated into a mobile device is received, the video content captured from a video display and including markers. At block 1110, the location of the video display is tracked utilizing the markers. At block 1115, the video content captured from the video display is identified using information from the markers. At block 1120, a temporal position within the video content is identified using information from the markers, wherein the markers are formatted to change to allow the temporal position to be identified.

Figure 12:
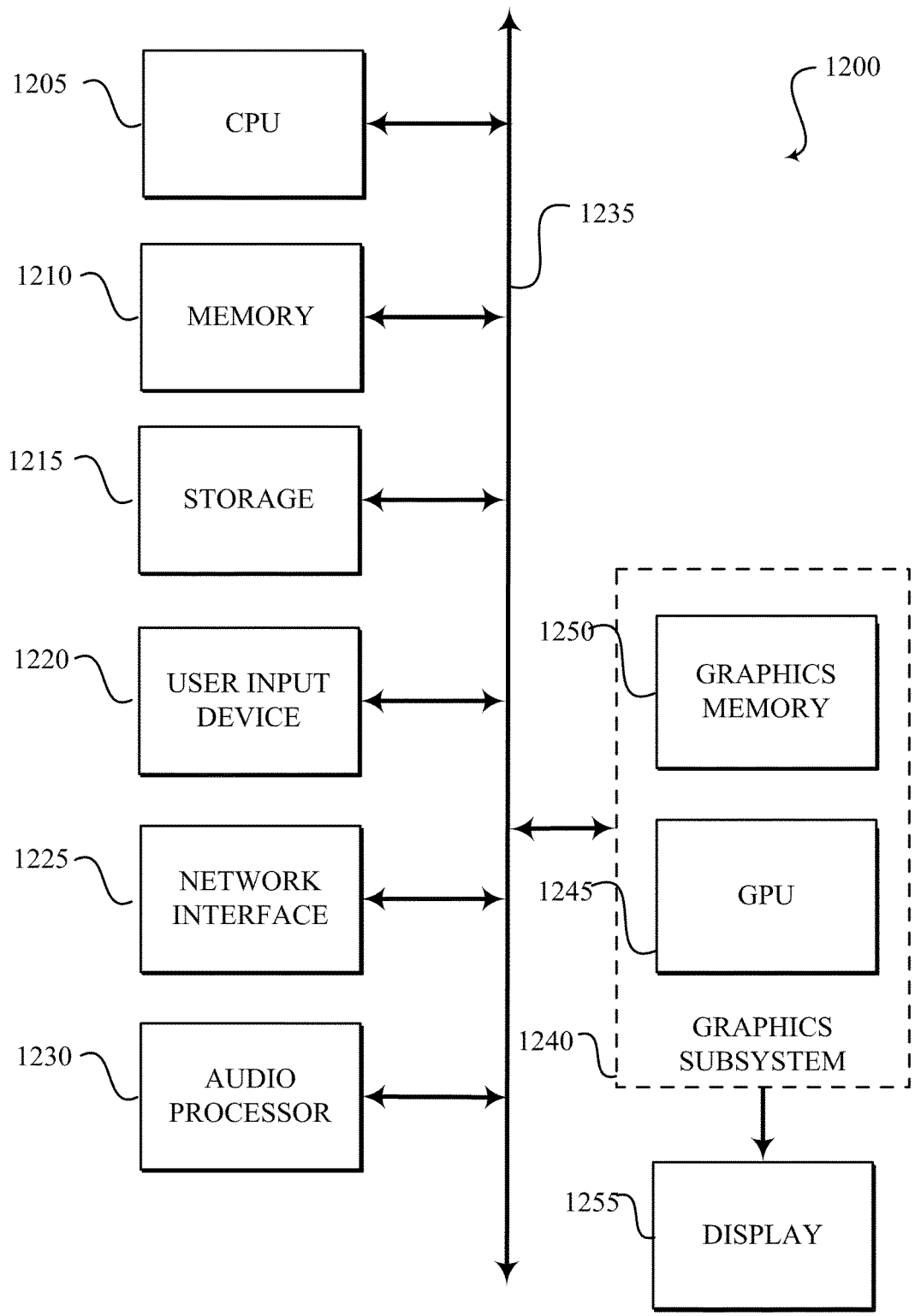
FIG. 12 illustrates components of an example device that can be used to perform aspects of the various embodiments.

At block 1125, supplemental content, including stand alone text and overlay graphics, is stored. At block 1130, the supplemental content is selected and accessed based on selections from a user of the mobile device, the identified video content, and the temporal position therein. At block 1135, the supplemental content is scaled and oriented responsive to the tracked location of the video display. At block 1140, the text, adjacent to the graphics overlaid on the captured video content, are displayed on the integrated display FIG. 12 illustrates an example of a hardware system suitable for implementing a device in accordance with various embodiments. This block diagram illustrates a computer system 1200, such as a personal computer, video game console and associated display (e.g., console device 305, 405 and video display 110 of FIG. 3 or 4), mobile device (e.g., mobile device 115 of FIG. 1, 2, 3, 4, or 5), personal digital assistant, or other digital device, suitable for practicing embodiments of the invention. Computer system 1200 includes a central processing unit (CPU) 1205 for running software applications and optionally an operating system. CPU 1205 may be made up of one or more homogeneous or heterogeneous processing cores. Memory 1210 stores applications and data for use by the CPU 1205. Storage 1215 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1220 communicate user inputs from one or more users to the computer system 1200, examples of which may include keyboards, mice, joysticks, touch pads, touch screens, still or video cameras, and/or microphones. Network interface 1225 allows computer system 1200 to communicate with other computer systems via an electronic communications network, and may include wired or wireless communication over local area networks and wide area networks such as the Internet. An audio processor 1230 is adapted to generate analog or digital audio output from instructions and/or data provided by the CPU 1205, memory 1210, and/or storage 1215. The components of computer system 1200, including CPU 1205, memory 1210, data storage 1215, user input devices 1220, network interface 1225, and audio processor 1230 are connected via one or more data buses 1235.

A graphics subsystem 1240 is further connected with data bus 1235 and the components of the computer system 1200. The graphics subsystem 1240 includes a graphics processing unit (GPU) 1245 and graphics memory 1250. Graphics memory 1250 includes a display memory (e.g., a frame buffer) used for storing pixel data for each pixel of an output image. Graphics memory 1250 can be integrated in the same device as GPU 1245, connected as a separate device with GPU 1245, and/or implemented within memory 1210. Pixel data can be provided to graphics memory 1250 directly from the CPU 1205. Alternatively, CPU 1205 provides the GPU 1245 with data and/or instructions defining the desired output images, from which the GPU 1245 generates the pixel data of one or more output images. The data and/or instructions defining the desired output images can be stored in memory 1210 and/or graphics memory 1250. In an embodiment, the GPU 1245 includes 3D rendering capabilities for generating pixel data for output images from instructions and data defining the geometry, lighting, shading, texturing, motion, and/or camera parameters for a scene. The GPU 1245 can further include one or more programmable execution units capable of executing shader programs.

The graphics subsystem 1240 periodically outputs pixel data for an image from graphics memory 1250 to be displayed on display device 1255. Display device 1255 can be any device capable of displaying visual information in response to a signal from the computer system 1200, including CRT, LCD, plasma, and OLED displays. Computer system 1200 can provide the display device 1255 with an analog or digital signal.

In accordance with various embodiments, CPU 1205 is one or more general-purpose microprocessors having one or more processing cores. Further embodiments can be implemented using one or more CPUs 1205 with microprocessor architectures specifically adapted for highly parallel and computationally intensive applications, such as media and interactive entertainment applications.

The components of the system 100 of FIG. 1, system 200 of FIG. 2, system 300 of FIG. 3, and/or system 400 of FIG. 4 may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for augmented video, the system comprising:
a video source configured to:
provide video content to a video display, the video content including video segments and a time variable marker anchored to a portion of the video content, wherein the time variable marker comprises a presented pattern in the video content, wherein:
the presented pattern changes over time,
a presented change to the presented pattern corresponds to a time code, identifies the video content, identifies a progression of the video content based on the time code, and does not identify supplemental content, and
the progression indicates a temporal position of a video segment relative to another video segment within the video content; and
a mobile device with an integrated display, the mobile device configured to:
track the video content on the video display using the time variable marker as an anchor;
determine the temporal position of the video segment from the presented change to the presented pattern of the time variable marker;
access, based on the video content and the temporal position, the supplemental content that corresponds to the video segment; and
display the supplemental content on the integrated display, wherein the display of the supplemental content is time synchronized with the display of the video segment based on the presented change to the presented pattern of the time variable marker.

2. The system of claim 1, wherein the mobile device further comprises an integrated video camera configured to capture the video content for display with the supplemental content on the integrated display.

3. The system of claim 2, wherein the mobile device identifies the video content by capturing the time variable marker using the integrated video camera.

4. The system of claim 1, wherein the supplemental content comprises content requested by a user with the mobile device.

5. The system of claim 1, wherein the video source comprises a video game console, the video content is a video game, and the supplemental content comprises first player-specific information for the video game for a user of the mobile device.

6. The system of claim 5, further comprising a second mobile device with an integrated display, the second mobile device configured to:
identify the video content displayed on the video display;
track the video content on the video display using the time variable marker as an anchor;
determine a game status of the video game based on the time variable marker;
access second player-specific information for the video game for a user of the second mobile device based on the game status, the second player-specific information different from the first information; and
display the second player-specific information on the integrated display of the second mobile device.

7. The system of claim 1, wherein the mobile device is configured to track the video display by identifying a position and orientation of the video content relative to the mobile device.

8. The system of claim 1, further comprising:
a supplemental content datastore, remote from the video display and mobile device and in communication with the mobile device, configured to store the supplemental content, wherein the mobile device accesses the supplemental content from the supplemental content datastore.

9. The system of claim 1, wherein the mobile device is remote from the video display, and wherein the supplemental content is accessed based on a view angle between the mobile device and the video display.

10. The system of claim 1, wherein the mobile device and a second mobile device are remote from the video display, wherein a view angle between the mobile device and the video display identifies a user profile associated with a user of the mobile device, wherein a second view angle between the mobile device and the video display identifies a second user profile associated with a second user of the second mobile device, wherein the supplemental content is accessed based on the user profile being identified according to the view angle, and wherein the supplemental content is different from second supplemental content that is accessed based on the second user profile.

11. The system of claim 1, wherein the mobile device has a stored low-resolution version of the video content, and wherein the display of the supplemental content is time synchronized with the display of the video content by at least performing image matching based on a hash of the stored low-resolution version of the video content.

12. The system of claim 1, wherein the time variable marker is presented at a frequency not perceptible to the human eye, and wherein the time variable marker is identified based on an application of a Fourier transform to the video segment.

13. The system of claim 1, wherein the time variable marker further comprises an audio marker, and wherein the temporal position is identified based on the audio marker.

14. A computer-implemented method for augmented video on a mobile device, the method comprising:
identifying video content displayed on a video display, wherein the video content comprises video segments and a time variable marker anchored to a portion of the video content, wherein the time variable marker comprises a presented pattern in the video content, wherein:
the presented pattern changes over time,
a presented change to the presented pattern corresponds to a time code identifies the video content, identifies a progression of the video content based on the time code, and does not identify supplemental content, and the progression indicates a temporal position of a video segment relative to another video segment within the video content;

identifying the temporal position in the identified video content using the time variable marker;

tracking the video content on the video display using the time variable marker as an anchor;

accessing the supplemental content based on the video content and the temporal position, the supplemental content corresponding to the video segment; and displaying the supplemental content on the mobile device, wherein the display of the supplemental content is time synchronized with the display of the video segment based on the presented change to the presented pattern of the time variable marker.

15. The computer-implemented method of claim 14, further comprising:

displaying the video content on the mobile device;

scaling and positioning the supplemental content on the mobile device to avoid overlaying the video content, wherein the supplemental content includes at least one of text, animations, graphic enhancements, advertisements, hyperlinks, and other information.

16. The method of claim 14, wherein the video content is available from a content source and is presented on a display according to a display rate, wherein the mobile device is configured to identify at time intervals the presented change to the presented pattern of the time variable marker on the display, wherein the time intervals are known to the mobile device and correspond to predefined time intervals that are different from the display rate and that the content source uses to update the time variable marker in the video presentation on the display.

17. A computer-implemented method for augmented video, the method comprising:

identifying video game content displayed on a video display, wherein the video game content comprises video game segments and a time variable marker anchored to a portion of the video game content, wherein the time variable marker comprises a presented pattern in the video game content, wherein:

the presented pattern changes over time, a presented change to the presented pattern corresponds to a time code, identifies the video game content, identifies a progression of the video game content based on the time code, and does not identify player-specific data, the progression indicates a temporal position of a video game segment relative to another video game segment within the video game content, and the video display is tracked by a first mobile device associated with a first player using the time variable marker as an anchor and is tracked by a second mobile device associated with a second player using the time variable marker as an anchor;

accessing first player-specific video data based on the time variable marker in the identified video game content such that the first player-specific video data is time synchronized with the video game segment based on the temporal position, wherein the accessed first player-specific video data is supplemental to and associated with the video game segment, for the first player;

transmitting the accessed first player-specific video data directed to the first mobile device for display based on a time synchronization from the presented change to the presented pattern of the time variable marker;

accessing second player-specific video data based on the time variable marker in the identified video game content such that the second player-specific video data is time synchronized with the video game segment based on the temporal position, wherein the accessed second player-specific video data is supplemental to and associated with the video game segment, for the second player; and transmitting the accessed second player-specific video data directed to the second mobile device for display based on the time synchronization from the presented change to the presented pattern of the time variable marker.

18. The computer-implemented method of claim 17, further comprising;

generating the first player-specific video data comprising text to be displayed on the first mobile device, the text to be positioned adjacent to captured images of the video game content on the first mobile device; and generating the second player-specific video data comprising graphics to be displayed on the second mobile device, the graphics to be positioned as overlay content on captured images of the video game content on the second mobile device.

19. The computer-implemented method of claim 18, wherein, the first player-specific video data is information available to the first player and unavailable to the second player; and the second player-specific video data is information available to the first player and the second player.

20. The computer-implemented method of claim 17, wherein, accessing first player-specific video data comprises accessing secret video data available to the first player and unavailable to the second player; and accessing second player-specific video data comprises accessing a view requested by the second player.

* * * * *